(12) United States Patent
Atlas et al.

(10) Patent No.: US 7,904,812 B2
(45) Date of Patent: Mar. 8, 2011

(54) BROWSEABLE NARRATIVE ARCHITECTURE SYSTEM AND METHOD

(75) Inventors: Larry Atlas, Stanfordville, NY (US); Douglas Smith, LaGrangeville, NY (US)

(73) Assignee: Web River Media, Inc., Lagrangeville, NY (US)

( * ) Notice: Subject to any disclaimer, the term of this patent is extended or adjusted under 35 U.S.C. 154(b) by 0 days.

(21) Appl. No.: 10/269,045

(22) Filed: Oct. 11, 2002

(65) Prior Publication Data

US 2004/0070595 A1    Apr. 15, 2004

(51) Int. Cl.
*G06F 3/00* (2006.01)
(52) U.S. Cl. .................. 715/716; 715/720; 715/721; 715/722; 715/723
(58) Field of Classification Search .......... 715/720–723, 715/726, 804, 805, 716; 709/232
See application file for complete search history.

(56) References Cited

U.S. PATENT DOCUMENTS

| | | |
|---|---|---|
| 4,305,131 A | 12/1981 | Best |
| 4,475,132 A | 10/1984 | Rodesch |
| 4,591,248 A | 5/1986 | Freeman |
| 4,689,022 A | 8/1987 | Peers et al. |
| 4,928,253 A | 5/1990 | Yamauchi et al. |
| 4,959,734 A | 9/1990 | Foster |
| 5,006,987 A | 4/1991 | Harless |
| RE33,662 E | 8/1991 | Blair et al. |
| 5,101,364 A | 3/1992 | Davenport et al. |
| 5,161,034 A | 11/1992 | Klappert |
| 5,189,402 A | 2/1993 | Naimark et al. |
| 5,237,648 A | 8/1993 | Mills et al. |
| 5,270,694 A | 12/1993 | Naimark et al. |
| 5,273,437 A | 12/1993 | Caldwell et al. |
| 5,307,456 A | 4/1994 | MacKay |
| 5,465,384 A | 11/1995 | Bejan et al. |
| 5,553,005 A | 9/1996 | Voeten et al. |
| 5,589,945 A | 12/1996 | Abecassis |
| 5,607,356 A | 3/1997 | Schwartz |
| 5,630,006 A | 5/1997 | Hirayama et al. |
| 5,632,007 A | 5/1997 | Freeman |
| 5,636,036 A | 6/1997 | Ashbey |
| 5,660,547 A | 8/1997 | Copperman |
| 5,684,715 A | 11/1997 | Palmer |
| 5,692,212 A | 11/1997 | Roach |
| 5,724,091 A | 3/1998 | Freeman et al. |
| 5,734,916 A | 3/1998 | Greenfield et al. |

(Continued)

OTHER PUBLICATIONS

Siklos, Richard, "In This Movie, the Audience Picks the Scene," *The New York Times*, Oct. 2, 2006.

(Continued)

*Primary Examiner* — Weilun Lo
*Assistant Examiner* — Mylinh Tran
(74) *Attorney, Agent, or Firm* — Crowell & Moring LLP

(57) ABSTRACT

A browseable narrative having an architecture that enables browsing, so that a user may progress from a point to any other point in the narrative in a manner determined by the user. The browseable narrative includes a scene or scenes without any predefined beginning, middle, or end which can be displayed in a non-linear manner. The narrative also includes links which interrupt the display of one scene and initiate the display of another. Maps may also exist in the narrative.

22 Claims, 8 Drawing Sheets

U.S. PATENT DOCUMENTS

| | | | |
|---|---|---|---|
| 5,760,767 A * | 6/1998 | Shore et al. | 345/723 |
| 5,818,435 A * | 10/1998 | Kozuka et al. | 715/500.1 |
| 5,819,103 A * | 10/1998 | Endoh et al. | 710/1 |
| 5,841,741 A | 11/1998 | Freeman | |
| 5,872,615 A | 2/1999 | Harris, Jr. | |
| 5,873,057 A | 2/1999 | Eves et al. | |
| 5,892,507 A * | 4/1999 | Moorby et al. | 715/500.1 |
| 5,910,046 A | 6/1999 | Wada et al. | |
| 5,963,203 A | 10/1999 | Goldberg et al. | |
| 6,105,046 A | 8/2000 | Greenfield et al. | |
| 6,108,001 A | 8/2000 | Tuttle | |
| 6,108,515 A | 8/2000 | Freeman | |
| 6,171,186 B1 | 1/2001 | Kurosawa et al. | |
| 6,272,625 B1 | 8/2001 | deCarmo | |
| 6,273,724 B1 | 8/2001 | Roytman | |
| 6,282,547 B1 * | 8/2001 | Hirsch | 707/102 |
| 6,650,826 B1 * | 11/2003 | Hatta | 386/52 |
| 6,708,184 B2 * | 3/2004 | Smith et al. | 707/104.1 |
| 2007/0005795 A1 * | 1/2007 | Gonzalez | 709/232 |

OTHER PUBLICATIONS

Canadian Broadcast Corporation, "'Browseable' indie film explores non-linear storytelling," Oct. 2, 2006.

* cited by examiner

BROWSEABLE NARRATIVE ARCHITECTURE SYSTEM AND METHOD

FIELD OF INVENTION

This invention relates to a method and system for creating, viewing, and editing browseable narrative architectures and the results thereof. Browseable narrative architectures are a type of narrative wherein the narrative may be created and viewed in a non-linear format; i.e., the narrative is presented to the user in a manner that may not progress forward according to a time sequence established by the author, with predetermined paths and branches. In the prior art, the author of a narrative simply presented material to a user. In an embodiment of the present invention, the author may introduce various decision or control points to guide the user, but in no case is the author required to set forth a predefined time sequence to establish the narrative. Indeed, the present invention eliminates the need of the author to establish a predefined time sequence. In addition, the present invention establishes a narrative that is browseable. This browseable feature allows the user to determine his or her own time sequence with respect to the narrative itself. More specifically, one embodiment of this invention relates to narratives that are videos: according to this embodiment, the video is non-linear and browseable, allowing user flexibility and a multitude of author options when delivering the content.

BACKGROUND OF THE INVENTION

Traditional narratives (e.g., books, motion pictures, television broadcasts, radio broadcasts), offer a diverse content of ideas, expressions, and communications. Despite this diversity, traditional narratives adhere to a linear format. In such a format, the narrative progresses from a starting point to an ending point, along a linear path. For example, a movie is presented to a user in a linear fashion: the user starts watching the movie, and the material is presented to the user in a predetermined manner that progresses from scene to scene in a linear fashion. Thus, linear narratives are stories or movies having one beginning that necessarily progress to one end.

More recently, with the advent and increasing popularity of computer systems to enhance the narrative process, the traditional linear narrative has been modified to accommodate branches to the storyline. Thus, for example, interactive movies are present in the prior art that allow a user to display a desired story line by selecting from among various story line options upon reaching decision points within the movie narrative. These interactive stories are branched narratives which progress from one beginning to any one of a plurality of endings depending on the story line selected. As a simple example, narrative videos exist which allow a user, at certain decision points, to choose among several options for how the narrative will progress. Once a user selects an option the narrative continues along the path determined by that decision "branch."

In addition, in prior art narratives, the story line might invoke a "loop" that enables the user to repeat or go back to a previously occurring scene. Despite this option, however, a narrative with a "loop" continues in a linear manner according to a predetermined manner following the return to the loop point.

In addition, the advent of computers has allowed a viewer to modify, in an interactive manner, certain characters or other items within the narrative. For example, in a video game, a user may dictate that a character take a certain action, such as fight another character. That action—that manipulation of the character—acts as decision points for the narrative which allow different narrative branches; thus, if the character defeats another character, one narrative path exists for the victorious character, while a defeat creates a different narrative path (usually the end of the game).

Despite these modifications, these narratives remain linear—the branches, loops, or options which occur due to story modification or character manipulation all continue the story in a linear manner, progressing from a beginning to an end (or to a plurality of endings). Thus, in the prior art, movies and games follow a traditional format in which a narrative progresses from a logical beginning to one or more logical endings and thus fail to take advantage of the full capabilities and power of computers and digital media devices. For example, known technologies do not easily permit a user to browse a video narrative and to explore particular areas or aspects of the narrative in more depth or less depth. The present invention, unlike the prior art, permits users to move from any point to any point within the narrative, unencumbered by defined beginnings and endings. In the prior art, user or viewer progresses inexorably from a beginning to an ending, or, in some instances, a different number of predefined endings. As a result, in the prior art the entertainment, advertising, educational, or other experience for a user viewing available movies on a personal computer is substantially similar to the viewing experience on a television or in a cinema.

The existing linear narrative structures, with their branching and looping structures, are shown in the prior art. For example, U.S. Pat. No. 5,607,356 to Schwartz describes an interactive game film intended to provide a realistic rendering of scenery and objects in a video game. The film is made up of data arranged in blocks or clips representing video film segments. Each block has a lead-in segment, a body segment, a loop segment, and a lead out segment. As the game is played the clips are seamlessly spliced together. The lead in and lead out segments can be used multiple times, with different body segments or loop segments each time to create multiple linear-time sequences in a mix and match process, on the fly, during playback. However, as shown in FIGS. 5 and 6 of the Schwartz patent, the film has a branched architecture and progresses from a logical beginning to at least one of several logical ends.

U.S. Pat. No. 5,101,354 to Davenport et al. describes a video editing and viewing facility and method that allows representation and arbitrary association of discrete image segments, for both creating final compositions and to permit selective viewing of related image segments. Editing and viewing of compositions can be achieved on a computer device. Information regarding each image segment is retained in a relational database so that each image segment can be identified and relationships established between segments in the database. Each segment, which acts as a narrative, is represented by icons. A user can elect to interrupt viewing of a particular segment and view a new image segment by selecting an icon that represents the new image segment. Viewing of the original image segment continues once display of the new image segment is completed. Importantly, the invention in Davenport relates to a narrative with a fixed beginning and a fixed ending. Although the author permits users to edit or otherwise modify a selected scene and interface that scene into the narrative, this editing process does not change the linear and non-browseable nature of the narrative. Relationships between segments, and thus the order in which segments are viewed, can be established by user selections, or by inferences based on user behavior, but the segments themselves have a logical linear relationship, with recognizable beginning and end points.

U.S. Pat. No. 4,591,248 to Freeman discloses a video system that makes use of a decision tree branching scheme. The video system displays a movie to an audience. The movie has multiple selectable scenes and the system includes a device for detecting and sampling audience responses concerning the selection of possible scenes and movie outcomes. Upon reaching a branching point in the movie, the system detects the prevalent audience selection and displays appropriate scenes. Scene selection is achieved by using dual movie projectors to present the movie. Different video tracks are turned on via a "changeover" signal which activates the appropriate projector.

U.S. Pat. No. 5,630,006 to Hirayama et al. relates to a multi-scene recording disk and a data reproducing apparatus which enables a user to view one of several simultaneously proceeding scenes. For example, the apparatus allows a viewer watching an opera to elect to watch the performer on stage or the orchestra that accompanies the performer. This involves the display a selection of multiple linear narratives rather than branched or looped narratives.

U.S. Pat. No. 5,684,715 to Palmer discloses an interactive video system in which a user can select an object displayed in the video and thereby initiate an interactive video operation, such as jumping to a new video sequence, altering the flow of the interactive video program, or creating a computer generated sequence.

U.S. Pat. No. 4,305,131 to Best describes a video amusement system embodied to run on a videodisc system. The system uses a simple branching technique which presents choices to a user to select video sequences for viewing. The system also permits users to carry on simulated conversations with the screen actors and to choose the direction that the conversation takes. The invention is also designed to avoid the ritualistic cycles which characterized earlier video games by using different audio each time video frames are repeated, by obscuring any unavoidable repetition by complex structures of alternative story lines, and by using digitally generated animation.

SUMMARY OF THE INVENTION

The present invention is a browseable narrative, and the architecture to allow that narrative to be created and viewed. The present invention also includes the systems and methods to create and view the resulting narratives.

The narratives of the present invention are comprised of a scene or scenes without any predefined beginning, middle, or end (hereinafter referred to as a "non-BME scene") presented in a non-linear manner. Links and maps may also exist in the narrative. The present invention narratives are also browseable, such that a user may progress from any point to any point through the narrative in a manner determined by the user. A user of the present invention may therefore create his or her own narrative, with the path of the narrative undetermined at any given point. Thus, a user may choose the number of non-BME scenes to view, the sequence of that viewing, the repetition of one or a plurality of the non-BME scenes in that viewing, and the like. This user-created narrative is in essence a unique awareness sequence not determined by the author. The narrative of the present invention allows authors the ability to insert a variety of controls to optimize, expand, and build in the possibility of different user experiences. However, even when controls are inserted into the narrative, it is not necessary for the user to proceed according to any preconditioned logical path or select in any predetermined manner among a set of controls. Instead, users have the ability to select among whatever controls are imposed by the author.

The browseable narrative architecture of the present invention enables an experience analogous to that of users of the World Wide Web. Using traditional browser software, an internet user selects an entry point, which is oftentimes a "home page," although the user may start the browser software and direct the browser to any web page desired by the user. After viewing one web page, the user determines another web page to visit; this web page may be related to the prior page or may not, but the user determines the order in which the web sites will be viewed. Control points (such as links) may be present on a web page to aid the viewer in browsing options, but the user has the discretion to decide whether or not to adhere to those control points.

The present invention's narrative (and methods and systems for creating and viewing said narratives) is presented to the user in a manner similar to internet web pages. The user may view the content (in the preferred embodiment, the content is a video) by picking a starting point, and moving from one element to the next in a manner determined by the user. Thus, the user "browses" the narrative according to his or her own selections. The user can move from any point to any point within the overall architecture of the narrative. Even though the narrative author may insert control points to offer browsing options to the user, such control points are not required to be followed in any designated manner and merely provide options for the user's unique awareness sequence. The user may view the narrative in any manner as he or she sees fit, and is not constrained to a linear, or linear-branching, or linear-looping progression.

The present invention's narrative (and methods and systems for creating and viewing said narratives) allows the author to create content by utilizing any number of scenes, with each scene having the ability to be entered and exited at any point while maintaining the narrative's continuity. The control points set by the author, and the potentially limitless narrative configurations arising from the use of one or a plurality of scenes with control points and links, establish a narrative that offers each user a unique viewing experience. The author enjoys the flexibility to provide a greater number of different narrative variations than in those narratives of the prior art.

DETAILED DESCRIPTION OF THE INVENTION

1. Overview

Figure 1:
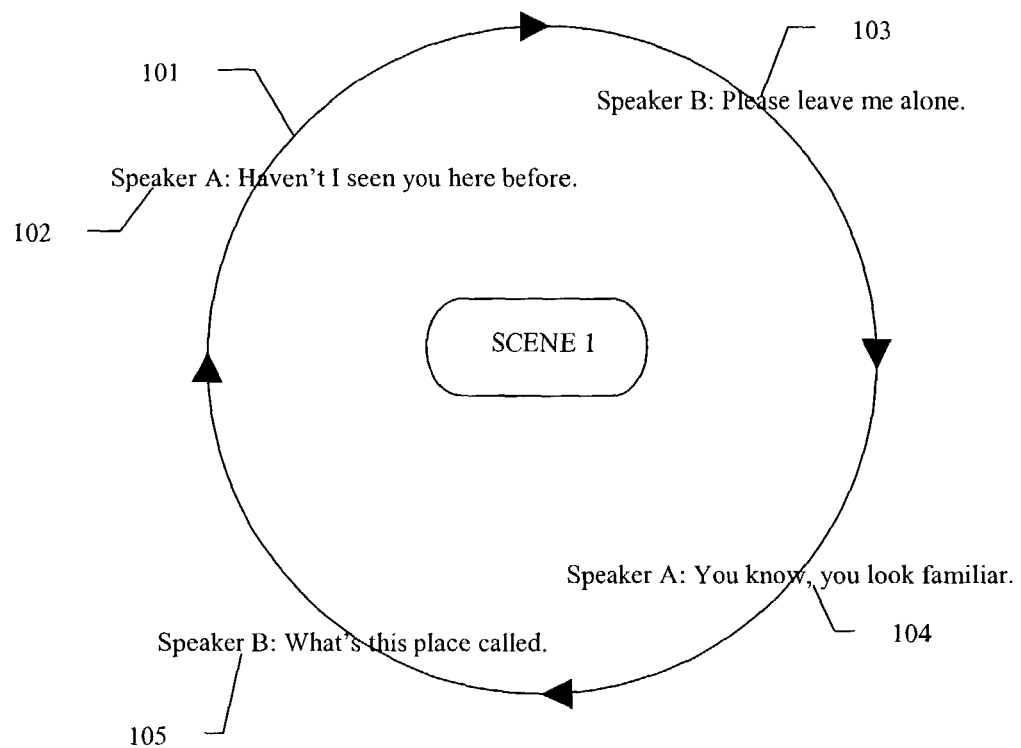
FIG. 1 is a diagram of a non-BME scene, the basic component of the narrative according to the present invention.

The present invention narrative, and the systems and methods for creating and viewing such a narrative, may be described as follows. The narrative of the present invention may include elements such as a non-BME scene, links, and maps.

Non-BME scenes are scenes which have no beginning, middle, or ending, but instead are presented as mere content devoid of any preconfigured biases (such as starting or ending points). A non-BME scene is the basic unit of the narrative of the present invention. Moreover, a non-BME scene may be any type of content expressed in any format. Thus, examples of non-BME scenes include dialogue, events, icons, video segments, audio segments, text, and music segments. The structure of the non-BME scene is more important than the type of content and format. According to the present invention, a non-BME scene is an entity in and of itself, not dependent on other scenes, plots, or other narrative controls. The preferred embodiment of a non-BME scene of the present invention is a video segment, with video and audio components. Unlike the prior art, however, the non-BME scene does not lead, follow, or exist as part of any larger linear and non-browseable structure—for example, as one video segment of a larger movie, following necessarily or leading necessarily another video segment of that same movie. The non-BME scene is without context and may be viewed by the user in any manner chosen by the user.

The link element of the narrative according to the present invention serves as a pathway over which the user may browse to view successive non-BME scenes. The link may be embodied in any manner which allows the user to navigate between or among several non-BME scenes; for example, the link may be a device which allows the user to enter in another non-BME scene selection, the link may be an icon or graphic symbol allowing the user to select another non-BME scene, and the link may be an automatic path which selects another non-BME scene without user input. These examples are meant to serve as illustrations, and do not exist as the only types of pathways between or amongst non-BME scenes which may be created and viewed by a user.

The map element of the narrative according to the present invention serves as an overview that may show non-BME scenes and potential links among non-BME scenes.

This basic structure of the narrative—non-BME scenes, links, and maps—allows a narrative that is browseable and non-linear. The narrative is browseable because the user determines his or her viewing experience, the user determines where he or she will begin the narrative process, the user determines the sequence in which the narrative process will occur, and the user determines when he or she will end his or her experience of the narrative process. The narrative is non-linear because the user is not required to follow any predetermined path when proceeding with the narrative—the user is not presented with a narrative with a beginning or end, and the middle may not be controlled by jump points, branches, loops, or other common narrative devices. Thus, in a video embodiment, the user is presented with the ability to choose among a selection of video segments (the non-BME scenes). These segments, or non-BME scenes, are configured such that they will be comprehended by the user upon viewing, without the need for context or prior segments. After viewing one non-BME scene, the user may choose, via a link, another non-BME scene to view. Again, when this second segment is viewed, its structure as a non-BME scene allows the user to comprehend this segment without context or the knowledge of prior segments. The user's viewing experience may be enhanced by prior segments, but such segments are not necessary for the user to view the narrative. In this manner—browsing by links between or among non-BME scenes according to an overall map—the user may assemble his or her own narrative in a browseable, non-linear fashion, and thus obtain his or her own unique awareness sequence.

Variations of these elements are possible according to selections of the narrative author. Thus, hybrid segments may be created which combine a non-BME scene with a linear scene of the type known in the art. The non-BME scenes may be either static or dynamic. Static non-BME scenes are non-BME scenes that do not allow any user manipulation, but retain their continuity by having no set beginning, middle, or end. Dynamic non-BME scenes contain control points that enable a non-BME scene to operate in a progressive, triggered, or other manner, thereby enhancing the narrative for the user.

2. Detail

The present invention relates to a method and system for creating, displaying, and viewing a narrative that is both browseable and non-linear. A narrative having a browseable narrative architecture is made up of one or a plurality of non-BME scenes. In a preferred embodiment, at least some non-BME scenes may be linked, so that a user can interrupt the display of one non-BME scene to view another non-BME scene. In this embodiment, each non-BME scene is a portion of video footage that represents the basic unit of a video narrative. Also, a map exists that details the individual non-BME scenes and the links between or among them.

Displaying and viewing of non-BME scenes is controlled by a rendering program that determines which non-BME scenes are to be displayed based on the occurrence of specified conditions and user input. A user views and interacts with the video narrative via a browser, a client program that incorporates video display software and provides an interface between the user and the rendering program.

FIG. 1 depicts a non-BME scene. As indicated, a non-BME scene is a presentation of content without a logical beginning, middle, or end, and is by itself neither linear nor branching. A non-BME scene may be static or dynamic. As an example, FIG. 1 depicts a single non-BME scene, scene 1, which may repeat itself until further activity by the user or author occurs. Events 102, 103, 104, and 105 are, in this example, statements made by speakers A and B. The events are shown disposed along story line 101 which, in this example, is shown progressing clockwise. Although here events 102, 103, 104, and 105 occur sequentially, the non-BME scene can be entered or exited at any point along story line 101 without corrupting the logic of the story line 101. Thus, the non-BME scene in FIG. 1 is a static non-BME scene which may repeat itself without modification an indefinite number of times until the scene is exited.

Figure 2:
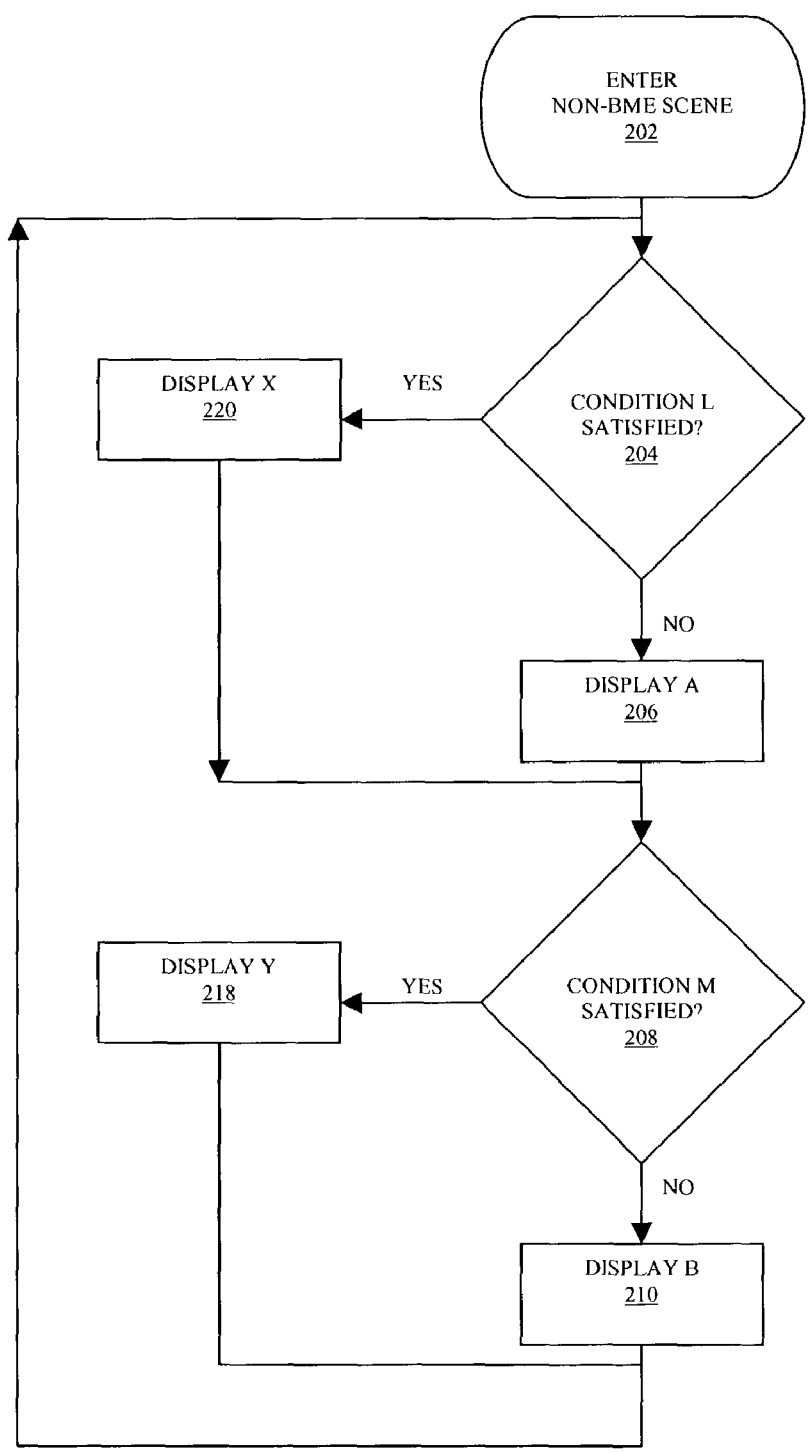
FIG. 2 is a diagram of a dynamic non-BME scene of a narrative according to the present invention.
Figure 3:
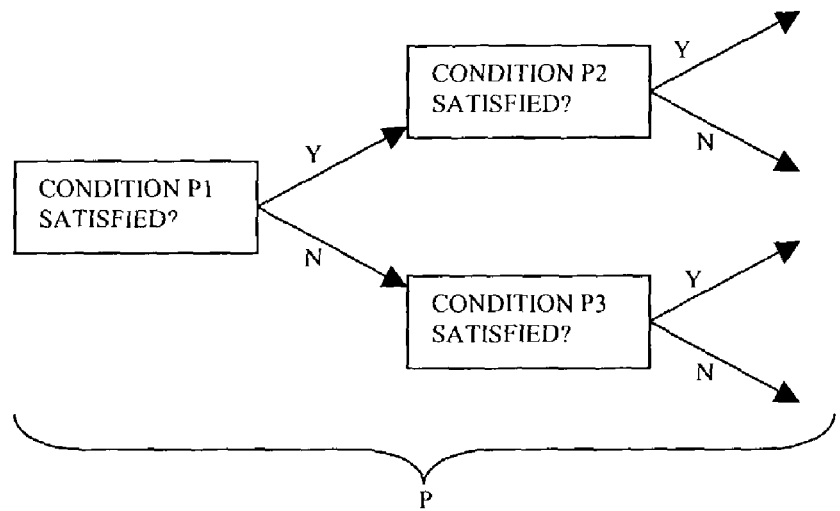
FIG. 3 is a diagram of a decision point of a narrative according to the present invention.

FIG. 2 depicts an example of a dynamic non-BME scene, as opposed to a static non-BME scene. Dynamic non-BME scenes of the present invention include at least one non-BME scene that may be viewed repeatedly. In the example shown in FIG. 2, the rendering program enters the dynamic non-BME scene in step 202. The rendering program then performs step 204 by determining whether condition L is satisfied. Condition L, like condition M, is some specified condition that alters the way the rendering program displays the video narrative. These conditions can be, for example, the completion of a number of scene repetitions, the input of a command by a user, or the prior accessing of certain non-BME scenes by a user. In addition, the conditions themselves can be dynamic, so that they change depending on whether certain events or controls have taken place. Dynamic conditions may also be made up of nested conditions. As shown in FIG. 3, dynamic condition P is made up of sub-conditions P1, P2, and P3 and the controlling condition can either be P2 or P3 depending on whether condition P1 has been satisfied.

In FIG. 2, if condition L is not satisfied the rendering program performs the "display A" instruction in step 206. Display A can be a default instruction to display a particular static or dynamic non-BME scene. If condition L is satisfied, the rendering program performs the display X instruction in step 220. The display X instruction can be to display an alternative non-BME scene; for example, a non-BME scene in which portrayed events are shown from different camera angles, in which portrayed characters behave differently, or in which different characters or other content appear, thus creating a different story line from scene A. Alternatively, the display X instruction can be to display scene A, but present the user with different command options, links, and icons from those in step 206 that can be selected to view a new non-BME scene or plurality of scenes.

Figure 4:
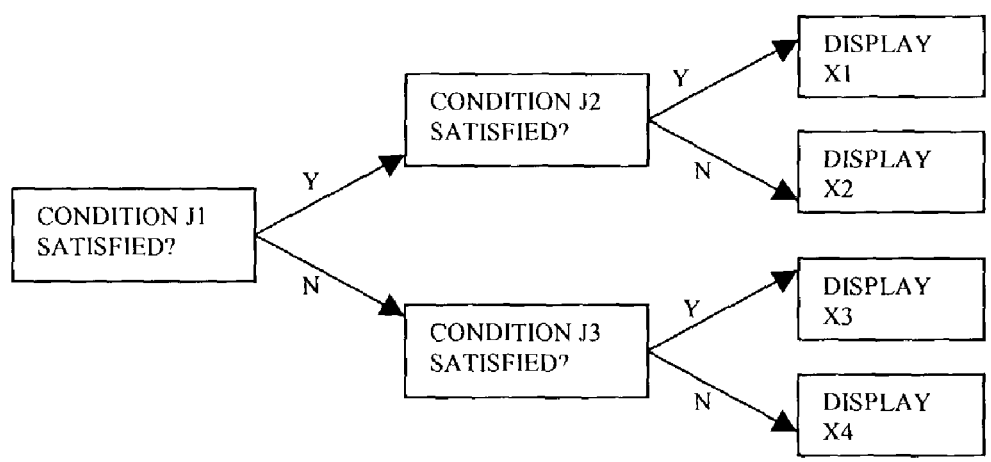
FIG. 4 is a diagram of a decision point of a narrative according to the present invention.

The display X instruction can be dynamic so that, for example, the instruction changes with every repetition of the non-BME scene, or upon the occurrence of some other event or programmable condition. FIG. 4 shows a dynamic display instruction where the instruction executed by rendering program depends on whether conditions J1, J2, or J3 have been satisfied. Display instruction X1, X2, X3, or X4 will be executed depending on which of the conditions are satisfied.

In FIG. 2, following either step 220 or step 206, the rendering program performs step 208 and determines whether condition M has been satisfied. If condition M has not been satisfied, the rendering program progresses to step 210 in which it performs the instruction display B and displays a specified non-BME scene. If condition M has been satisfied, the rendering program performs instruction display Y in step 218. The display Y instruction can be to display an alternative non-BME scene; for example, a non-BME scene in which portrayed events are shown from different camera angles, in which portrayed characters behave differently, or in which different characters or other content appear, thus creating a different story line from scene B. Alternatively, the display Y instruction can be to display scene B, but present the user with different command options, links, and icons from those in step 210 that can be selected to view new non-BME scenes. Also, the display Y instruction can be dynamic, so that the instruction changes with every repetition of the dynamic non-BME scene, or upon the occurrence of some other event or programmable condition, such as the prior display of certain non-BME scenes, or known user preferences. On completion of either of steps 218 and 210, the rendering program returns to step 204.

In the example shown in FIG. 2, steps 204, 206 and 220 can collectively be referred to as a dynamic non-BME scene, as can steps 208, 210, and 218. Those skilled in the art will understand that dynamic and static non-BME scenes can be combined to produce a complex pattern of nested non-BME scenes, where the scenes occur within other non-BME scenes.

Figure 5:
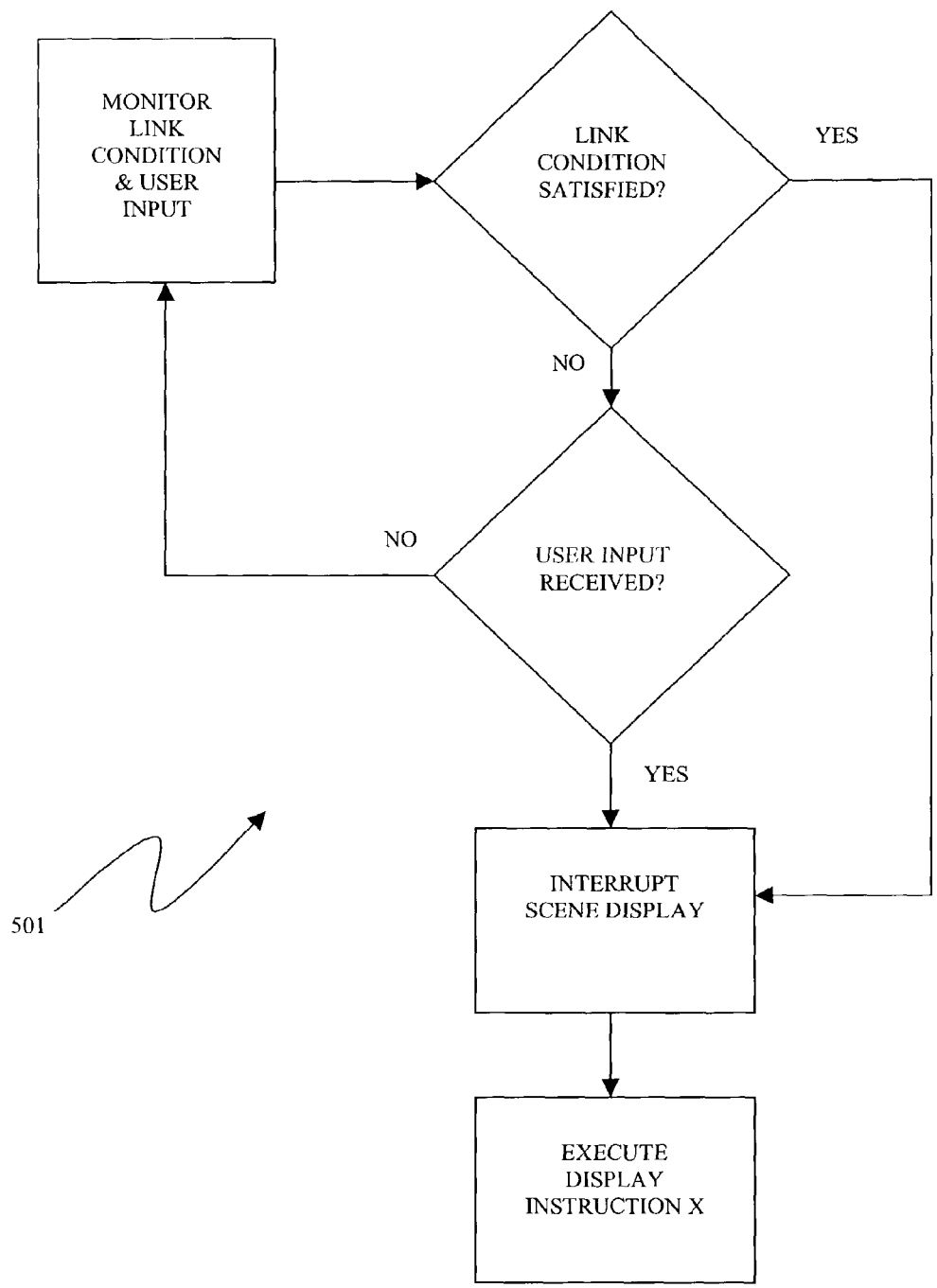
FIG. 5 is a diagram of a link structure of the narrative according to the present invention.

As described, one or a series of non-BME scenes (whether static, dynamic, or a combination of both) may be combined in a manner so as to create a different narrative. This combination of non-BME scenes occurs through a link. FIG. 5 depicts a link, or pathway to allow a user to follow a narrative of a plurality of non-BME scenes. At any time during the video narrative, the rendering program may permit a user to execute the link 501 defined here as an instruction interrupting the display of a first non-BME scene to display a second selected non-BME scene. To enable a user to input instructions and execute links, the rendering program can cause the browser to display links in various ways. In one embodiment, the links can be displayed as icons representing non-BME scenes. Icons are displayable objects that a user can select to execute links. The icons can be thumbnail static or video images located to one side of the main video window. Alternatively, icons can be objects forming part of the viewed non-BME scene and located within the main video window. Any non-BME scene, either static or dynamic, can contain a limitless number of links from that non-BME scene to another, or a series, of non-BME scenes.

Links may operate in conjunction with static and dynamic non-BME scenes to create a narrative in a manner that is inherently variable. Thus, for example, in a dynamic non-BME scene, a condition may occur that leads to a link to view a second non-BME scene instead of or in addition to the first non-BME scene depending on whether a defined condition is satisfied when the first dynamic non-BME scene is viewed. Thus, for example, a single dynamic non-BME scene may have as its dynamic condition a link to another non-BME scene (without regard to whether the other non-BME scene is static or dynamic) on the Nth repetition of the first dynamic non-BME scene. Thus, in the narrative, multiple non-BME scenes can be joined together by links. Non-BME scenes can be exited and entered via a link by the occurrence of a specified condition, or by receiving a user instruction which initiates a new non-BME scene. The narrative author can create and fully specify links in the narrative. Alternatively, links may be formulated or modified by the rendering program based on rules and conditions specified by the author, and on the occurrence of events or input of user instructions. Thus, the rendering program may execute links and initiate the display of new non-BME scenes at any point in the new non-BME scenes, or may initiate entirely different non-BME scenes depending on the occurrence of specifiable conditions or user inputs and behavior.

Figure 6:
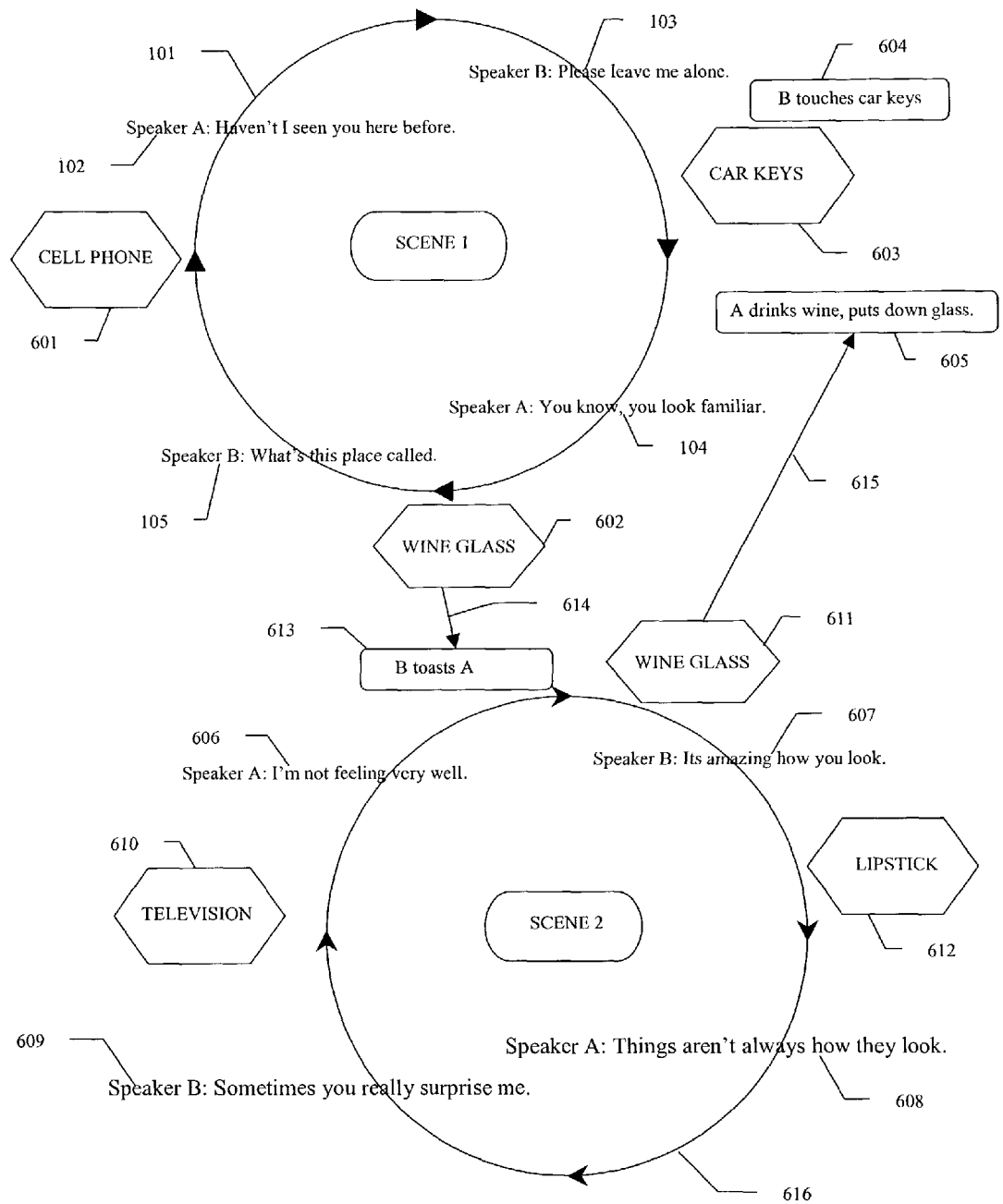
FIG. 6 is a diagram of a combination of non-BME scenes linked in a narrative according to the present invention.

FIG. 6 is a diagrammatic representation of an example of two linked non-BME scenes, scene 1 and scene 2 that follow story lines 101 and 616 respectively. The scenes are connected by links 614, 615. Events 102, 103, 104, 105 in scene 1, and 606, 607, 608, 609, in scene 2 are statements made by speakers A and B. Event 613 represents an action taken in scene 2, and events 604, 605 are actions taken in scene 1. Hexagonal shapes in FIG. 6 represent items shown within the non-BME scenes. Cell phone 601, wine glass 602, and car keys 603 are items displayed in scene 1, and television 610, lipstick 612, and wine glass 611 are items displayed in scene 2. Any item displayed in a scene can be configured to be an icon. In the example shown in FIG. 6 the wine glass 602 and the wine glass 611 are icons. By selecting wine glass 602 while scene 1 is being displayed, a user inputs an instruction to the rendering program to execute link 614 causing scene 1 to be interrupted and commencing scene 2 at action 613. Similarly, by selecting wine glass 611 while scene 2 is being displayed, a user inputs an instruction to the rendering program to execute link 615 causing scene 2 to be interrupted and commencing scene 1 at action 605.

By combining the use of links with display instructions and conditions, the rendering program can be made to disable or enable various links at certain times during the display of a video narrative, or under certain conditions. For example, certain links may be disabled until a user has viewed particular non-BME scenes or until the non-BME scene being displayed has been viewed in its entirety at least once. Icons may be revealed or links enabled according to other rules or schedules specified by the author. For example, icons could be hidden within the frame of the main image in a non-visible manner, and discoverable only via mouse-pointer exploration by a user. Thus, in FIG. 6 displayed items such as the cell phone 601, car keys 603, the television 610, and the lipstick 612 can be associated with links in many different ways, such as when the narrative is created or upon the occurrence of conditions. The structure of the links is such that they may be used to combine non-BME scenes in a manner that allows different exit points from a non-BME scene, and different entry points to a non-BME scene, upon the occurrence of different conditions as established by the narrative's author.

Figure 7:
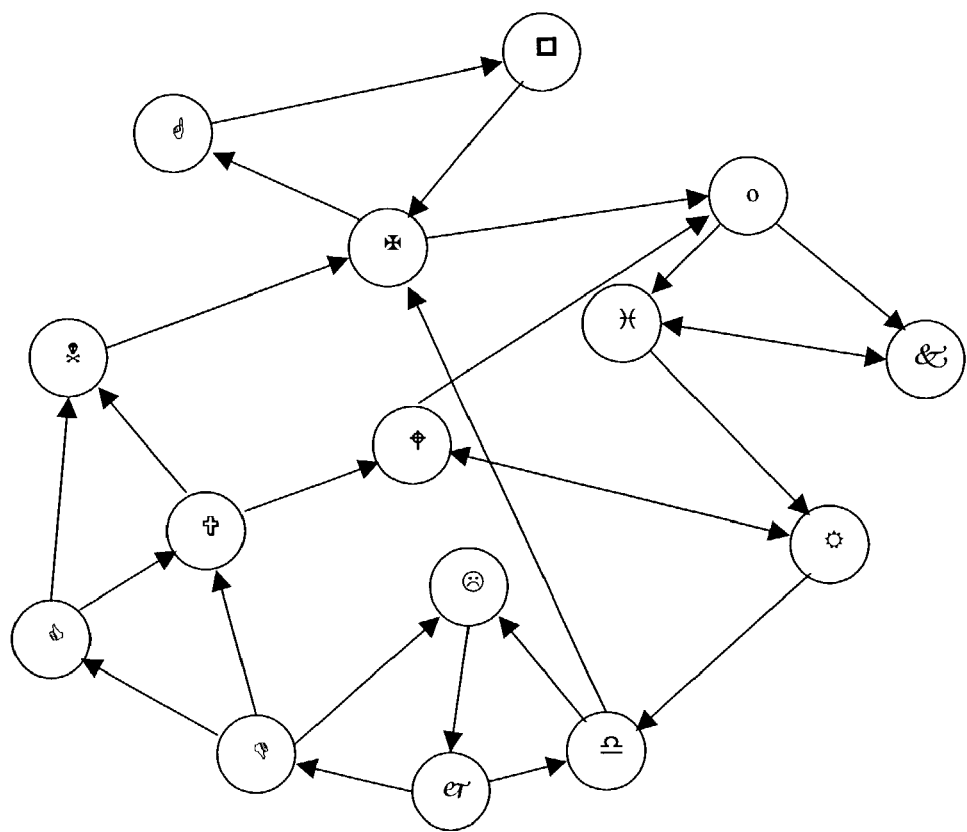
FIG. 7 is a diagram of a map structure of the narrative according to the present invention.

To assist a user in navigating through the video narrative, one embodiment of the present invention provides a displayable map which is a visual representation of non-BME scenes and links that make up the video narrative. The map can include features indicating to a user which non-BME scenes have been viewed, and permitting a user to plan which non-BME scenes to view. One depiction of a map of the present invention is shown in FIG. 7. Non-BME scenes are represented by circles, and links are represented by arrows between non-BME scenes. In the embodiment shown, the scenes are identified by symbols within the circles. The map can be an interactive object that can be zoomed on to reveal ever greater detail of the non-BME scenes traversed. Details can include, for example, characters present, location, language, or assigned ratings that are indicative of suitability of non-BME scenes for a particular audience.

Note that the narrative of the present invention can be created without the existence of hierarchies between non-BME scenes, so that a user can view any non-BME scene at any time unless restrictions are imposed by the author. Thus, in general, a user may begin by viewing any non-BME scene, then link to any other non-BME scene for which links have been established. No interactivity or other information input is required of the viewer; rather, using the method described, the viewer selects his or her way through the story, similar to the way one browses or surfs the Web.

In one embodiment of the present invention, the data structure of a video narrative preferably permits unconstrained development in terms of authoring new non-BME scenes and links, and creating new tools for rendering and browsing a video narrative. Non-BME scenes can be individual files stored in directories or folders. The data structure can be made up of files organized into folders or directories and stored in a repository. The repository can be located on some type of computer readable data storage medium located on a storage device. Computer readable storage media include, for example, an optical storage medium such as a compact disc or a digital versatile disc, on a magnetic storage medium such as a magnetic disc or magnetic tape or, alternatively, in a memory chip. The repository can be located on a single storage device or distributed among several storage devices located across networks. In addition to files for each non-BME scene, the data structure can include data elements or documents in a markup language such as, for example, extensible markup language ("XML"), which are stored in files. Table 1 shows an example of a data structure or file system stored in the repository. At the top level, the top level directory, "Abacus folder," includes a file "Abacus1.xml" which contains the XML definition of the video narrative and any globally shared resources such as branding elements. The file also includes a pointer to a first non-BME scene that may be viewed, credits and URLs to permit user access to relevant web sites. The "logo.gif" file contains branding information, and the "Path1.xml" file contains non-BME scene and transition sequence information.

In a "Scene Folder" subdirectory under the "Abacus folder" directory is contained scene files.

TABLE 1

ABACUS FOLDER
    Abacus1.xml
        Contains: Abacus name, homepage URL, credits, logo URL,
        first scene pointer.
    Logo.gif
    Path1.xml
        Contains scene and transition sequence history
    SCENE FOLDER
        Scene1.xml
            Contains: Name, Abacus URL, Script URL, Loop video
            URL, Outward link1
            Target type (scene, Web, etc.), start and stop time,
            destination URL, destination start frame
        Script.doc
        Videoasset1.*
        Videoasset2.*

Figure 8:
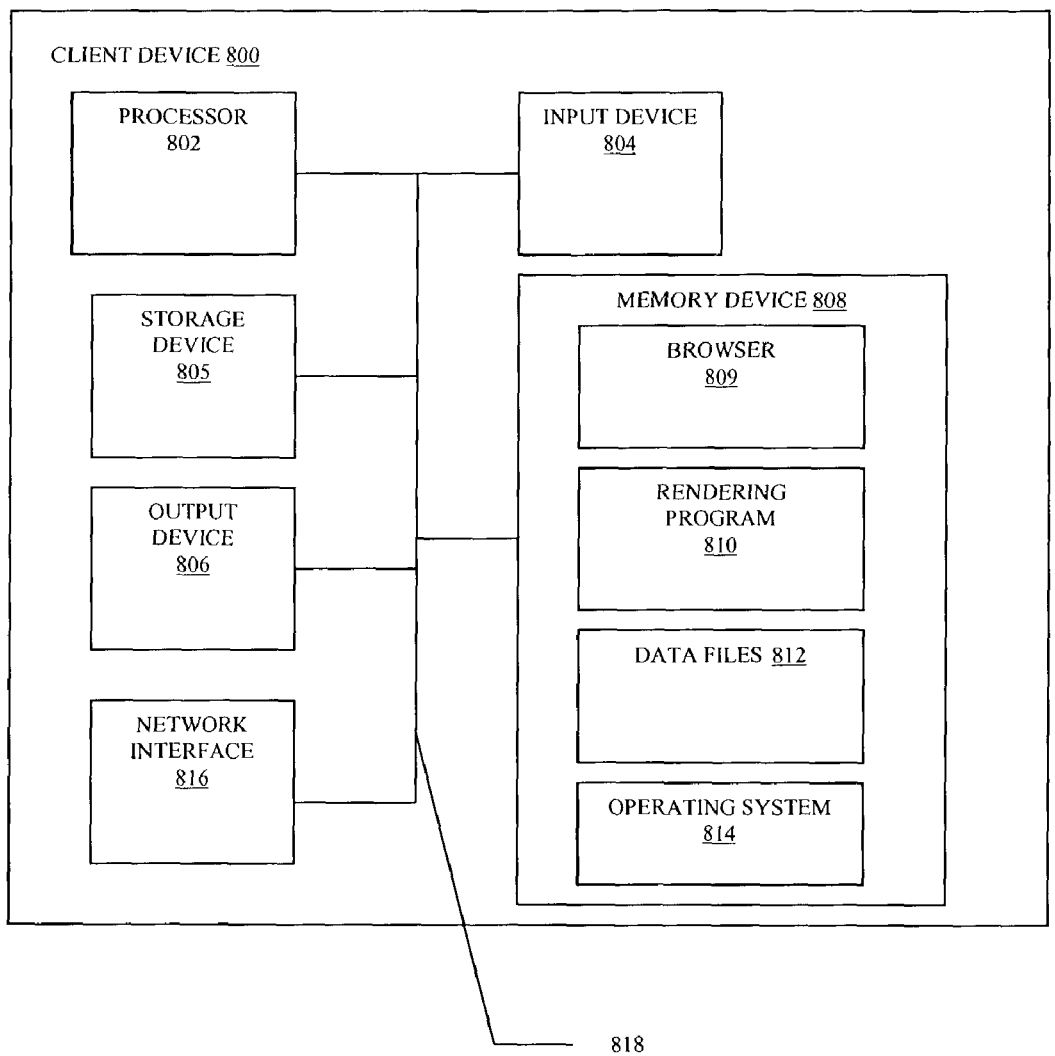
FIG. 8 is a diagram of a computer system for the creation and viewing of a narrative according to the present invention.

The video narrative of the present invention can be displayed on a client device 800 as shown in FIG. 8. The client device is a device operated by a user and includes a processor 802 operatively coupled via a bus 818 to an input device 804, a memory device 808, a storage device 805, an output device 806 and optionally a network interface 816. The input device 804 is a device capable of receiving inputs from a user, and communicating the inputs to processor 802. Inputs can include data, commands, and instructions. An input device 804 can include devices such as a keyboard, a mouse-pointer, a joystick, and a touch screen device. Storage device 805 is a device for reading from and optionally writing to computer readable media loaded into the storage device 805. Thus, computer readable media can include, for example, a magnetic hard discs, magnetic tapes, or optical discs. The storage device 805 provides non-volatile data storage and stores programs that can be executed by processor 802 to control and manipulate the client device 800 as desired. Stored programs can include, for example, browser 809, rendering program 810 and operating system 814. Also on the storage device 805 can be stored data files 812 which can include the data structure of the video narrative of the present invention. Thus, the storage device 805 can store the repository or portions of the repository for access by the processor 802. The output device 806 transmits information from the processor 802 to the user. The output device 806 can include for example, a video monitor and speakers. The network interface 816 converts information transmitted to it via bus 818 into a form suitable for transmission over a network and vice versa. The memory device 808 is a temporary store of information and data that is stored in a convenient form for access by processor 802.

When using the client device 800 to view a video narrative, the user inputs instructions to the input device 804 causing the processor 802 to appropriately manipulate the client device. The operating system program 814 contains instructions and code necessary for the processor 802 to manipulate the client device. Upon receiving instructions to display a video narrative, processor 802 loads and executes browser program 809 and rendering program 810. Executing rendering program 810 causes processor 802 to access data files 812, some of which may be stored on the storage device 805 or may be remotely located on remote storage devices connected to the client device 800. For convenience and rapid access by processor 802, data files 812 can be stored in memory device 808. Data files 812 are read and the video narrative contained in the files is converted into a form useable by browser 809 in conformance with instructions received from the user via input device 804. Executing browser 809 causes the processor 802 to convert the output of the rendering program 810 into a form useable by the output device 806. The processor also executes the browser 809 to transmit the converted output to the output device 806 and to control the output device 806 appropriately.

Figure 9:
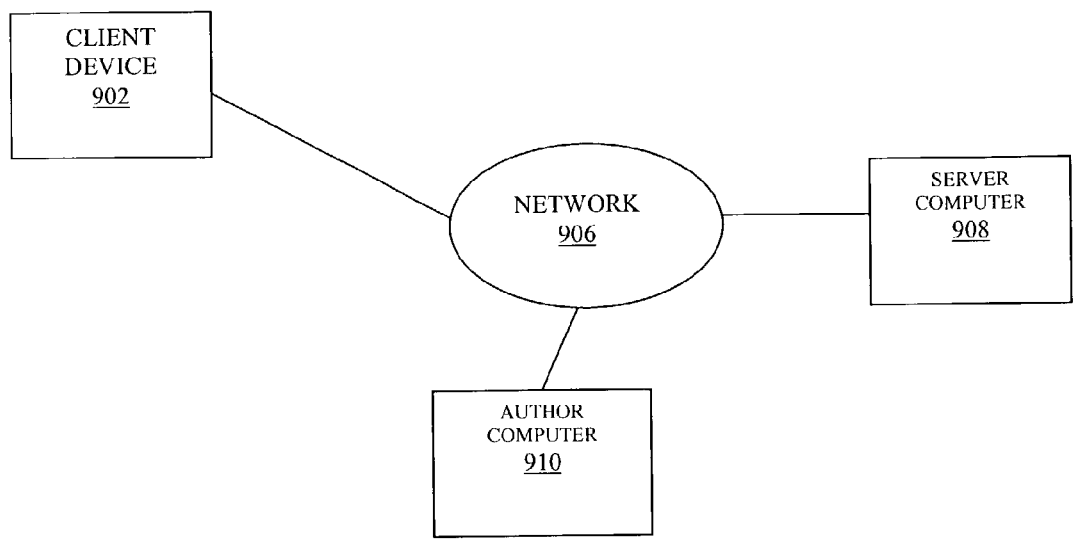
FIG. 9 is a diagram of a networked computer environment for the creation and viewing of a narrative according to the present invention.

The narrative may also be presented over a networked environment of the type shown in FIG. 9. The client device 902 can be a computer, a digital versatile disc player, a personal digital assistant or other device having a processor coupled via a bus to a memory device. In this embodiment, the client device 902 is coupled to a network 906 through a network interface. Also connected to the network 906 is the server computer 908 and, optionally, author computer 910. The server computer 908 includes a processor coupled to a memory device and a network interface via a bus. Optionally, the server computer 908 can also include a storage device, an input device, and an output device. Thus, the server computer can include components similar to the client device depicted in FIG. 8. Although FIG. 9 shows a single client device 902, server computer 908, and author computer 910, those skilled in the art will understand that other embodiments of the present invention can include multiple client devices 902, server computers 908, and author computers 910 connected to the network 906.

The client device 902 can access a repository containing at least a portion of the browseable narrative stored on the server computer 908. The repository can be stored on a storage device in the server computer 908. In accessing the repository, the client device 902 can send an command to the server computer 908 instructing the server computer to transmit a non-BME scene to the client device 902, which can display the non-BME scene as it is received. A rendering program executed by the server computer 908 can read data files contained that make up the browseable narrative in the repository and convert them into a form that can be displayed on the client device 902 using a browser program running on the client device. Optionally, the data files can be transmitted to the client computer 902 where they can be rendered and displayed.

The author computer 910 can include components and devices similar to the client device 902. However, the author computer 910 includes authoring software that can be stored in a memory device which is coupled to a processor via a bus. The authoring software includes code or a program executable by the processor that permits an author to create and edit and view a browseable narrative of the present invention. Thus, the authoring software enables video editing, creating and editing multimedia files, and creating and editing links, non-BME scenes and linear scenes, display instructions, and conditions. Data files and program files may be created in the authoring process. The authoring program also permits the creation, editing and maintenance of the repository in which can be stored the browseable narrative data and program files. The author computer 910 and its authoring software can create and access the repository, which may be stored on the author computer 910 or a device directly connected thereto, or on a remotely located server computer 908, or remotely client device 902.

When a narrative of the present invention is created, that narrative consists of non-BME scenes linked together according to an overall map. The narrative is non-linear and non-branching. Because each non-BME scene has no beginning, middle, or end, a combination of non-BME scenes allows a continuous, unlimited, and seamless narrative. The user has flexibility as to what particular non-BME scenes to view, although the narrative authors may override this user discretion upon certain conditions. As described above, non-BME scenes, connected through links, may be added or deleted upon the occurrence or non-occurrence of certain conditions expressed in any given non-BME scene. User navigation and control may occur through icons placed in a non-BME scene, through other cues (including graphical, audio, or textual cues), both operated in conjunction with the computer system described above.

The resultant narrative of the present invention may be presented to the user by any conveyance mode existing in the art. For example, the narrative may be available on the Internet, which allows a user to log-on to the relevant narrative Internet site to view the narrative. The narrative may also be presented to the user through common conveyance modes such as satellite transmissions, cable television (or audio) transmissions, or through the conveyance systems offered by personal video recorders. In addition, removable media may be used as a conveyance method for a narrative of the present invention, such that DVD's or compact disks may be used to store the narrative for later playback on the appropriate player equipment of the art.

A system of the present invention allows, as one embodiment, the creation of a narrative by use of a personal computer of the type known in the art, and using software in conjunction with that hardware to manipulate the various elements of the narrative. On a computer system, users may view the narrative (if in the embodiment of a video narrative) through appropriate playback software such as Windows MediaPlayer, RealPlayer, Macromedia Player, and the like. Specialized software may also be created to allow the user to play the narrative in a manner that allows the acceptance and processing of commands. Likewise, specialized software may also be created to allow the author to create a narrative in a manner that allows the acceptance and processing of commands.

The narratives of the present invention may be used in a variety of applications. For example, the narratives may be used for entertainment purposes, such as in video narratives, music or video games. The narratives may also be used for educational purposes in a manner which allows a student to progress through the narrative and create his or her own educational experience in a non-repetitive manner. The narratives may also be used for advertising purposes and other purposes that take advantage of the non-BME scenes and the unique, browseable narratives created by the present invention.

The narratives of the present invention result in the creation of a viewing experience that is unique to each user. A user, through the selection of links, control points, and other narrative controls, will view a non-BME scenes, or series of non-BME scenes, in a unique manner. The potentially limitless possibilities when viewing each non-BME scene (or scenes) results in an equally potentially limitless variation for a viewer's experience.

As detailed, the present invention result in the ability for authors to create a potentially limitless number of narratives through the application of one or a plurality of non-BME scenes, links, control points, and maps. The author's creation of a narrative can vary depending on the techniques described in the present invention so as to create the ability for users to establish their own viewing experience.

As will be understood by those skilled in the art, many changes in the apparatus and methods described above may be made by the skilled practitioner without departing from the spirit and scope of the invention.

We claim:

1. A method for simultaneously displaying and determining the sequence of scenes in a narrative on a client device comprising:

retrieving from a repository a first scene having no predefined beginning middle or end and a second scene having no predefined beginning middle or end, the repository including a browseable narrative that includes said first scene and said second scene;

executing a first display instruction wherein at least a portion of said first scene is displayed;

executing a link; and executing a second display instruction wherein at least a portion of said second scene is displayed, wherein said first and second scenes are comprised of content that is not dependent on any prior content in a narrative, and wherein said first and second scenes are linked in a non-linear relationship and wherein the resulting combination of said first and second scenes forms a seamless, continuous, understandable narrative;

wherein at least one of said first and said second scenes is a dynamic scene;

wherein executing a link includes receiving user inputs and selecting or formulating links based on the received inputs, and wherein executing a link causes scenes to be configured in a non-linear relationship.

2. The method of claim 1, wherein executing one or both of a first display instruction and executing a second display instruction includes:

displaying a third scene having no predefined beginning middle or end upon occurrence of a condition specified in said narrative, wherein said third scene is comprised of content that is not dependent on any prior content in a narrative, and wherein said third scene is linked in a non-linear relationship.

3. The method of claim 1, wherein the repository includes a plurality of links, and executing a link includes executing a link from the repository, wherein executing a link causes scenes to be configured in a non-linear relationship.

4. The method of claim 1, wherein executing a link includes formulating a link, wherein said formulated link causes scenes to be configured in a non-linear relationship.

5. The method of claim 1, wherein executing a link includes receiving a user instruction to execute a link, and wherein executing a link causes scenes to be configured in a non-linear relationship.

6. The method of claim 1, wherein executing a link includes determining whether a link condition has occurred.

7. A method, in a server computer connected to a client device, for simultaneously displaying and determining the sequence of scenes in a narrative comprising:

receiving a request to display a first scene having no predefined beginning middle or end from the client device;

retrieving from a first repository a first scene having no predefined beginning middle or end, the first repository including a first portion of a browseable narrative that includes said first scene having no predefined beginning middle or end;

transmitting to the client device at least any part of said first scene having no predefined beginning middle or end;

receiving a link instruction from the client device;

executing a link;

retrieving from a second repository a second scene having no predefined beginning middle or end, the second repository including a second portion of a browseable narrative that includes said second scene having no predefined beginning middle or end; and transmitting to the client device at least any part of said first scene having no predefined beginning middle or end;

wherein said first and second scenes are comprised of content that is not dependent on any prior content in a narrative, and wherein said first and second scenes are linked in a non-linear relationship and wherein the resulting combination of said first and second scenes forms a seamless, continuous, understandable narrative;

wherein at least of said first and said second scenes is a dynamic scene;

wherein executing a link includes receiving user inputs and selecting or formulating links based on the received inputs, and wherein executing a link causes scenes to be configured in a non-linear relationship.

8. The method of claim 7, wherein the first repository and the second repository are the same.

9. The method of claim 7, wherein the first repository and the second repository are located on a separate storage devices which are connected to the server computer via a network.

10. The method of claim 7, wherein the client device is connected to the server computer via a network.

11. A client device useful for simultaneous displaying and determining the sequence of scenes in a narrative comprising a processor coupled to a memory, wherein the client device is configured to perform the steps of:

retrieving from a repository a first scene having no predefined beginning middle or end and a second scene having no predefined beginning middle or end, the repository including a browseable narrative that includes said first scene and said second scene;

executing a first display instruction wherein at least a portion of said first scene is displayed;

executing a link; and executing a second display instruction wherein at least a portion of said second scene is displayed, wherein said first and second scenes are comprised of content that is not dependent on any prior content in a narrative, and wherein said first and second scenes are linked in a non-linear relationship and wherein the resulting combination of said first and second scenes forms a seamless, continuous, understandable narrative;

wherein at least one of said first and said second scenes is a dynamic scene;

wherein executing a link includes receiving user inputs and selecting or formulating links based on the received inputs, and wherein executing a link causes scenes to be configured in a non-linear relationship.

12. The client device of claim 11, wherein the client device includes a storage device and wherein the storage device has stored thereon at least a portion of the repository.

13. The client device of claim 11, wherein the step of retrieving from a repository includes retrieving a repository stored on a storage device connected to the client device via a network.

14. The client device of claim 11, wherein the step of executing one or both of a first display instruction and executing a second display instruction includes:

displaying a third scene having no predefined beginning, middle or end upon occurrence of a condition specified in said narrative, wherein said third scene is comprised of content that is not dependent on any prior content in a narrative, and wherein said third scene is linked in a non-linear relationship and wherein the resulting combination of said first, second and third scenes forms a seamless, continuous, understandable narrative.

15. The client device of claim 11, wherein the step of executing a link retrieves the link from the repository.

16. The client device of claim 11, wherein the step of executing a link includes formulating a link, wherein said formulated link causes scenes to be configured in a non-linear relationship.

17. An article useful for simultaneous displaying and determining the sequence of scenes in a narrative comprising:
a storage medium having stored thereon a computer executable program for performing the steps of:
retrieving from a repository a first scene having no predefined beginning, middle or end and a second scene having no predefined beginning, middle or end, the repository including a browseable narrative that includes said first scene and said second scene;
executing a first display instruction wherein at least a portion of said first scene is displayed;
executing a link; and
executing a second display instruction wherein at least a portion of said second scene is displayed,
wherein said first and second scenes are comprised of content that is not dependent on any prior content in a narrative, and wherein said first and second scenes are linked in a non-linear relationship and wherein the resulting combination of said first and second scenes forms a seamless, continuous, understandable narrative;
wherein at least one of said first and said second scenes is a dynamic scene;
wherein the step of executing a link includes receiving user inputs and selecting or formulating links based on the received inputs, and wherein executing a link causes scenes to be configured in a non-linear relationship.

18. The article of claim 17, wherein the step of executing one or both of a first display instruction and executing a second display instruction includes:
displaying a third scene upon occurrence of a condition specified in said narrative, wherein said third is comprised of content that is not dependent on any prior content in a narrative, and wherein said third scene is linked in a non-linear relationship and wherein the resulting combination of said first, second, and third scenes forms a seamless, continuous, understandable narrative.

19. The article of claim 17, wherein the step of executing a link includes executing a link from the repository, wherein executing a link causes scenes to be configured in a non-linear relationship.

20. The article of claim 17, wherein the step of executing a link includes formulating a link, wherein said formulated link causes scenes to be configured in a non-linear relationship.

21. The article of claim 17, wherein the step of executing a link includes receiving a user instruction to execute a link, and wherein executing a link causes scenes to be configured in a non-linear relationship.

22. The article of claim 17, wherein the step of executing a link includes determining whether a link condition has occurred.

* * * * *